United States Patent [19]

Ohwada et al.

[11] Patent Number: 5,075,404

[45] Date of Patent: Dec. 24, 1991

[54] CONCRETE-PROTECTIVE MATERIAL

[75] Inventors: Takeo Ohwada, Ibaraki; Kazuyuki Tanaka; Etsuji Iwami, both of Hitachi, all of Japan

[73] Assignee: Hitachi Chemical Company, Ltd., Tokyo, Japan

[21] Appl. No.: 548,984

[22] PCT Filed: Apr. 12, 1989

[86] PCT No.: PCT/JP89/00394

§ 371 Date: Jul. 30, 1990

§ 102(e) Date: Jul. 30, 1990

[87] PCT Pub. No.: WO90/11982

PCT Pub. Date: Oct. 18, 1990

[51] Int. Cl.⁵ .............................................. C08G 18/67
[52] U.S. Cl. ........................................ 528/49; 528/75; 526/227; 526/301
[58] Field of Search ................... 528/49, 75; 526/227, 526/301

[56] References Cited

U.S. PATENT DOCUMENTS 4,985,523 1/1991 Mochizuki et al. ................ 526/301

Primary Examiner—Maurice J. Welsh
Attorney, Agent, or Firm—Antonelli, Terry, Stout & Kraus

[57] ABSTRACT

A concrete-protective material containing a dicyclpentadiene derivative represented by formula,

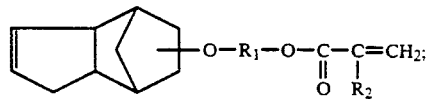

an ethylenically unsaturated monomer having a hydroxyl group, a polyvalent isocyanate compound having not less than 2 isocyanate groups, and other ethylenically unsaturated monomer.

4 Claims, No Drawings

CONCRETE-PROTECTIVE MATERIAL

FIELD OF ART

This invention relates to a concrete-protective material to coat the surface of concrete.

TECHNICAL BACKGROUND

In the fields of civil engineering and construction, processes for spray painting and resin lining on the surface of a concrete structure to prevent deterioration of the concrete structure are widely known.

Further, processes for improvement of adhesion, gas permeability, water permeability, etc., by incorporating a synthetic polymer emulsion into cement paste and cement mortar are also known, and as a process for improvement of adhesion of cement mortar, there is a process for precoating the surface with a synthetic polymer emulsion to promote adhesion of the mortar, as is described in Japanese Patent Publication No. B-Sho-44-18757.

The above prior techniques have a problem that it cannot but rely on periodic repainting and mending of an outer surface to maintain long durability, since they do not give any sufficient adhesion to concrete.

DISCLOSURE OF THE INVENTION

In view of the above problem, this invention aims to provide a concrete-protective material which is excellent not only in adhesion to concrete but also in durability.

BEST MODE FOR CARRYING OUT THE INVENTION

This invention relates to a concrete-protective material comprising
(A) 10 to 90 parts by weight of a dicyclopentadiene derivative represented by the following general formula

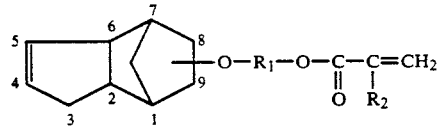

wherein $R_1$ is selected from (a) an alkylene group having 2 to 12 carbon atoms and (b) an organic group having 4 to 12 carbon atoms, having at least two alkylene chains bonded through at least one oxygen atom where each of the alkylene chains has at least two carbon atoms, and represented by formula $(CH_2)_n-O-(CH_2)_m$ (in which n and m may be different or the same, $n+m$ is 4 to 12, and both n and m represent integers of not less than 2), and $R_2$ represents hydrogen or a methyl group,
(B) 5 to 50 parts by weight of an ethylenically unsaturated monomer having a hydroxyl group,
(C) 5 to 50 parts of a polyvalent isocyanate compound having not less than 2 isocyanate groups, and
(D) 0 to 40 parts by weight of other ethylenically unsaturated monomer copolymerizable with the components (A) and (B),
the total weight being 100 parts by weight.

In the dicyclopentadiene derivative as the component (A) in this invention, a monovalent organic group having an ethylenic double bond represented by the following formula

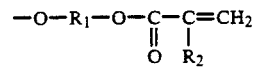

is attached to the 8-position or 9-position of its dicyclopentadiene group.

In the above formula, $R_1$ and $R_2$ are as defined previously.

Examples of the dicyclopentadiene derivative represented by the above general formula include dicyclopentenyloxyalkyl acrylates or methacrylates such as dicyclopentenyloxyethyl acrylate, dicyclopentenyloxyethyl methacrylate, dicyclopentenyloxypropyl acrylate, etc., acrylic esters or methacrylic esters of polyalkylene glycol dicyclopentadiene monoether such as acrylic ester or methacrylic ester of diethylene glycol dicyclopentenyl monoether, etc., and dicyclopentenyloxyethyl methacrylate is preferable.

The dicyclopentadiene derivative represented by the above general formula is used in an amount of 10 to 90 parts by weight. When the amount is less than 10 parts by weight, the adhesion strength is degraded, and when it exceeds 90 parts by weight, the drying ability is poor.

Examples of the component (B), an ethylenically unsaturated monomer having a hydroxyl group, include hydroxyalkyl acrylates such as 2-hydroxyethyl acrylate, 2-hydroxypropyl acrylate, 2-hydroxybutyl acrylate, and corresponding hydroxyalkyl methacrylates, and 2-hydroxyethyl methacrylate is preferable. The amount thereof for use is 5 to 50 parts by weight. When the amount is less than 5 parts by weight, the drying ability is poor and when it exceeds 50 parts by weight, the adhesion to concrete is degraded.

Examples of the component (C), a polyvalent isocyanate compound having not less than 2 isocyanate groups, are compounds having not less than 2 isocyanate groups, such as polymethylene polyphenyl polyisocyanate, hexamethylene diisocyanate, tolylene diisocyanate, xylylene diisocyanate, isophorone diisocyanate, lysine diisocyanate, diphenylmethane diisocyanate, 2,2,4-trimethylhexamethylene diisocyanate, cyclohexylmethane diisocyanate, methylcyclohexane diisocyanate, isopropylidenebis(4-cyclohexyl isocyanate), burette form of hexamethylene diisocyanate, trimer of isophorone diisocyanate containing an isocyanurate ring, and the like, and polymethylene polyphenyl polyisocyanate is preferable. The amount thereof for use is 5 to 50 parts by weight. When the amount is less than 5 parts by weight, the resistance to water is poor, and when it exceeds 50 parts by weight, the impregnating ability into concrete is degraded.

Further, examples of the component (D), ethylenically unsaturated monomer copolymerizable with the components (A) and (B), include alkyl acrylates having an alkyl group having 1 to 12 carbon atoms such as methyl acrylate, ethyl acrylate, butyl acrylate, 2-ethylhexyl acrylate, etc., alkyl methacrylates corresponding to these alkyl acrylates, styrene or substituted styrenes such as vinyl toluene chlorostyrene α-methylstyrene etc.. unsaturated nitriles such as acrylonitrile, methacrylonitrile, etc., polymerizable monomers having a hydroxyl group such as N-methylol acrylamide, N-methylol methacrylamide, alkyl etherified compounds of these, etc., and the like. Further, also usable as required are vinyl monomers such as vinyl acetate, vinyl chloride, etc., polyfunctional monomers such as divinyl benzene, diallyl phthalate, triallyl isocyanurate, etc., α,β-unsaturated monocarboxylic acids such as acrylic acid, methacrylic acid, crotonic acid, etc., unsaturated dicarboxylic acids such as maleic acid, fumaric acid, itaconic acid, etc., and polymerizable monomers having an oxirane group such as glycidyl methacrylate, etc. Each of these is usable in combination with one other or others. The amount thereof for use is 0 to 40 parts by weight, and when the amount exceeds 40 parts by weight, the drying ability is degraded.

The components (A), (B), (C) and (D) are used in such amounts that the total weight is 100 parts by weight within the range of the above part by weight of each of the components. In addition, as a catalyst for copolymerization of the above components, organic oxides such as benzoyl peroxide, methyl ethyl ketone peroxide, ditert-butyl peroxide, cumene hydroperoxide, and the like are used.

As a polymerization promoter, polyvalent metal salts such as cobalt naphthenate, cobalt octenoate, etc., aromatic amine of dimethylaniline, and the like are used.

Further, a urethane reaction promoter such as dibutyltin laurate, or the like may be used as required.

The reaction temperature is usually from −20° C. to 50° C., and it is preferable to adjust the pot life of the monomer mixture by adjusting the reaction promoters depending upon the temperature difference between summer and winter and by sometimes using a polymerization inhibitor such as hydroquinone, or the like.

A filler, plasticizer, epoxy resin, urethane resin, unsaturated polyester resin, etc., may be used as required.

The concrete-protective material of this invention can be used as a primer for carrying out spray-painting, resin lining etc., on a concrete structure and other shaped articles.

EXAMPLES

This invention will be illustrated according to Examples.

In addition, "part" stands for "part by weight" and "%" for "% by weight" hereinbelow.

EXAMPLE 1

0.8 part of 6% cobalt octenoate and 0.08 part of dimethylaniline were mixed with 30.8 parts of dicyclopentenyloxyethyl methacrylate and 9.2 parts of 2-hydroxyethyl methacrylate, and the mixture was referred to as Liquid A.

Then, 10 parts of polymethylene polyphenyl polyisocyanate (Millionate MR-100, manufactured by Nippon Polyurethane K.K.) and 1.2 part of benzoyl peroxide (active component 50%) were mixed in a separate container, and the mixture was referred to as Liquid B.

A mortar plate prepared according to JIS A6916 ((coating material for adjustment of cement-based surface), 5.2 (testing substrate)) was coated with 1.45 g of a mixture of the above Liquids A and B (300 g/m²) by using a brush, and the tack free time of the coating was examined at 25° C. The test piece was directly left to stand for 24 hours as a test specimen.

EXAMPLE 2

0.75 part of 6% cobalt octenoate and 0.3 part of dimethylaniline were mixed with 26.5 parts of dicyclopenteneyloxyethyl methacrylate and 11.25 parts of 2-hydroxyethyl methacrylate, and the mixture was referred to as Liquid A.

Then, 12.5 parts of polymethylene polyphenyl polyisocyanate and 1.1 parts of benzoyl peroxide (active component 50%) were mixed in a separate container, and the mixture was referred to as Liquid B.

A mortar plate was coated in the same way as in Example 1, and the tack free time of the coating was examined. The coated mortar plate was directly left to stand for 24 hours as a test specimen.

EXAMPLE 3

0.8 part of 6% cobalt octenoate and 0.08 part of dimethylaniline were mixed with 20.8 parts of dicyclopentenyloxyethyl methacrylate and 9.2 parts of 2-hydroxyethyl methacrylate, and the mixture was referred to as Liquid A.

Then, 10 parts of polymethylene polyphenyl polyisocyanate and 1.2 parts of benzoyl peroxide (active component 50%) were mixed in a separate container, and the mixture was referred to as Liquid B.

A mortar plate was coated in the same way as in Example 1, and the tack free time of the coating was examined. The coated mortar plate was directly left to stand for 24 hours as a test specimen.

COMPARATIVE EXAMPLE 1

0.8 part of 6% cobalt octenoate and 0.08 part of dimethylaniline were mixed with 40.8 parts of dicyclopentenyloxyethyl methacrylate and 9.2 parts of 2-hydroxyethyl methacrylate, and the mixture was referred to as Liquid A.

Then, 1.5 parts of benzoyl peroxide (active component 50%) alone was charged into a separate container, and this liquid was referred to as Liquid B.

A mortar plate was coated in the same was as in Example 1, and the tack free time of the coating was examined. The coated mortar plate was directly left to stand for 24 hours as a test specimen.

By using the test specimens of the above Examples 1 to 3 and Comparative Example 1, which were examined on the tack free time and left to stand for 24 hours at 25° C., and, as Comparative Example 2, an uncoated mortar plate on which the concrete-protective material of this invention was not coated, their adhesion strengths, water absorptions and durabilities were tested according to JIS A6916 5.6 (adhesion strength test), 5.9 (water absorption test) and 5.10 (durability test. The following Table shows the results.

TABLE

|  |  | Example 1 | Example 2 | Example 3 | Comparative Example 1 | Comparative Example 2 |
| --- | --- | --- | --- | --- | --- | --- |
| Tack free time |  | 40 min. | 10 min. | 50 min. | 18 hr. | — |
| Adhesion | Adhesion strength (kgf/cm²) | 20.8 | 23.2 | 20.3 | 21.5 | 9.8 |
|  | Peeled state | Concrete breakage | Concrete breakage | Concrete breakage | Concrete breakage | Interfacial breakage |
| Water absorption (g) |  | 0.6 | 0.6 | 0.8 | 0.7 | 15 |

TABLE -continued

| | | Example 1 | Example 2 | Example 3 | Comparative Example 1 | Comparative Example 2 |
|---|---|---|---|---|---|---|
| Durability | Appearance | No change | No change | No change | No change | Partially cracked |
| | Adhesion strength (kgf/cm$^2$) | 20.4 | 22.7 | 20.1 | 20.0 | 6.5 |

Industrial Utility

The concrete-protective material of this invention is useful as a concrete-protective material which is excellent in both adhesion to concrete and durability.

Further, the concrete-protective material of this invention is quick-dryable and hence conveniently easy in handling in a construction field, and it has many fields of application.

What is claimed is:

1. A concrete-protective material comprising
   (A) 10 to 90 parts by weight of a dicyclopentadiene derivative represented by the following general formula

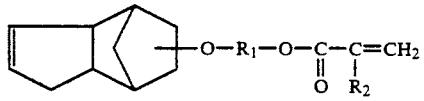

wherein $R_1$ is selected from (a) an alkylene group having 2 to 12 carbon atoms and (b) an organic group having 4 to 12 carbon atoms, having at least two alkylene chains bonded through at least one oxygen atom where each of the alkylene chains has at least two carbon atoms, and represented by formula $(CH_2)_n-O-(CH_2)_m$ (in which n and m may be different or the same, n+m is 4 to 12, and both n and m represent integers of not less than 2), and $R_2$ represents hydrogen or a methyl group,
   (B) 5 to 50 parts by weight of an ethylenically unsaturated monomer having a hydroxyl group,
   (C) 5 to 50 parts by weight of a polyvalent isocyanate compound having not less than 2 isocyanate groups, and
   (D) 0 to 40 parts by weight of other ethylenically unsaturated monomer copolymerizable with the components (A) and (B),
   the total weight being 100 parts by weight.

2. A concrete-protective material according to claim 1 wherein the component (A) is dicyclopentenyloxyethyl methacrylate, the component (B) is hydroxyalkyl (meth)acrylate, and the component (C) is polymethylene polyphenyl polyisocyanate.

3. A concrete-protective material according to claim 1 or 2 which further contains organic peroxide.

4. A concrete-protective material according to any one of claims 1 to 3 which further contains a polymerization promoter.

* * * * *